Nov. 8, 1966
L. L. SMITH ET AL
3,284,573
SINGLE DIGIT ADAPTER CIRCUIT
Filed Nov. 12, 1963
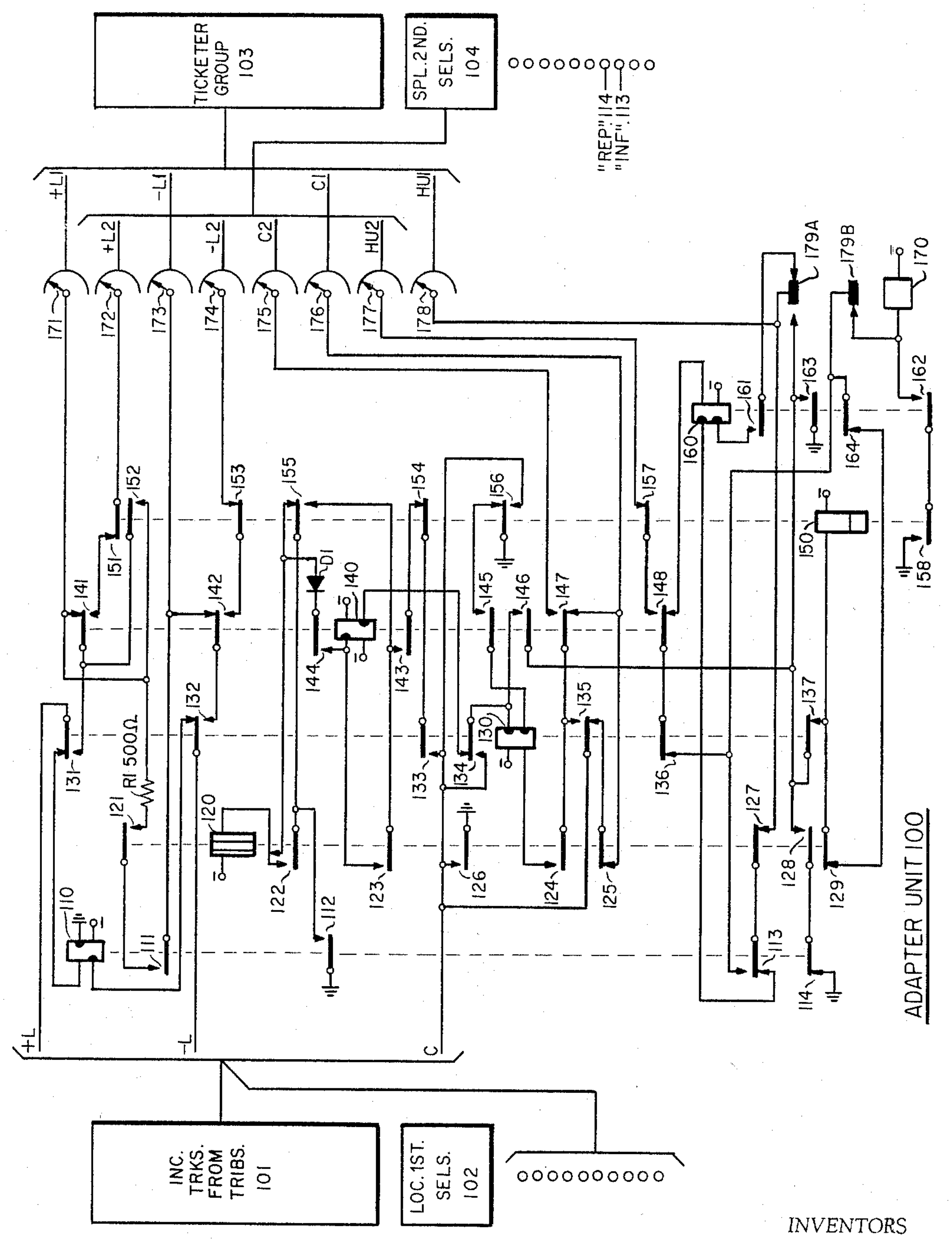
INVENTORS
Lester L. Smith
Jack W. Taugner
BY C. A. Gullbrandson
ATTY

United States Patent Office 3,284,573

Patented Nov. 8, 1966

3,284,573

SINGLE DIGIT ADAPTER CIRCUIT

Lester L. Smith, McHenry, and Jack W. Taugner, Park Ridge, Ill., assignors to Automatic Electric Laboratories, Inc., Northlake, Ill., a corporation of Delaware Filed Nov. 12, 1963, Ser. No. 322,756

8 Claims. (Cl. 179—7.1)

This invention pertains to telephone systems and more particularly to those systems in which the telephone subscriber is permitted to dial other subscribers in distant exchanges directly.

More particularly this invention relates to an adapter circuit whereby subscribers by dialing a single digit access code can access the switching equipment necessary to place a person to person collect or special call on a direct dial basis, or by dialing a different single digit access code access a common trunk group for centralized answering to provide special services such as information, repair service, etc.

This adapter would find its greatest application in a system like that disclosed in the copending application of E. J. Bonnano, Serial No. 61,240, filed October 7, 1960, now Patent No. 3,133,153.

Accordingly it is the object of the present invention to provide an adapter circuit making possible the accessing of special service equipment and direct distance dial circuits by means of a single digit access code in a manner so as to not involve the direct distance dial circuits while special service information is being provided.

A feature of the present invention is the provision of circuitry that can differentiate between reception of the digit 1 and other digits.

Another feature shall be the inclusion of circuitry that preselects an available ticketer for use in completing directly dialed toll calls on the premise that more toll calls shall be placed than special service calls.

Other objects and features of the invention pertain to this particular arrangement of the circuit elements of the system whereby in the above outline additional operating features are obtained.

The invention both as to its organization and method of operation together with further objects and advantages thereof will best be understood by reference to the following specification taken in connection with the accompanying drawing which is a schematic diagram of an adapter unit according to this invention placed in the environment of an automatic toll ticketing telephone system of the type permitting the subscriber to directly dial toll calls to specific subscribers in distant offices.

The drawing shows the incoming connections to the adapter unit 100 which as understood may be part of a group of similar adapters which are accessed in common by incoming trunks from tributary offices such as 101 and from local first selector levels such as 102. On an outgoing basis the adapter 100 accesses a ticketer group 103 and special second selectors 104 which have access to repair, information or other special service circuits where service is provided by operators or possibly by prerecorded message announcers.

The broadly described adapter unit 100 upon being accessed from either one of the trunks of the incoming trunk group 101 or from one of the local first selectors 102 returns busy tone if the second digit is dialed before a ticketer has been seized or if all of the ticketers are busy and the second digit is two or greater, it also returns busy tone if all the special second selectors 104 are busy and the second digit is 1. Special service calls to repair, information, etc. may progress even if all the ticketers in the group 103 are busy, and conversely person to person collect or special service calls (PPCS) may progress if all the special second selectors in the group 104 are busy. For a more retailed understanding of this invention reference should be made to the drawing and the following description.

Prior to seizure by the accessing circuit 101 or 102, the adapter circuit 100 operates on a preselecting basis to secure access to an available ticketer in the ticketer group 103. If while the adapter circuit is not being used the ticketer then being accessed via levels 171, 173, 176 and 178 of the rotary switch becomes busy, a ground is returned over the HU1 lead and the associated bank contact and wiper of level 178. This ground is conducted to the interrupter 179A of the rotary switch and also to the motor magnet 170 via a path that extends from the wiper of level 178 through contacts 127 and 113, the upper winding of relay 160, contact 148, contact 136, the interrupter 179B and its associated contact, to the motor magnet 170. Extension of this ground causes motor magnet 170 to operate as well as relay 160. As motor magnet 170 operates to step its associated wipers to an available ticketer, ground is returned from each busy ticketer over the HU1 lead. However when an absence of ground is encountered on one of the bank contacts connected via an HU1 lead to an available ticketer, hunting stops and relay 160 restores. Operation of relay 160 was effective at contacts 163 to provide ground via the make contact of interrupter 179 to continue the stepping of the rotary switch.

The adapter circuit 100 is accessed either from an incoming trunk circuit 101 or from a level on selector 102. The relay 110 is operated by completion of a loop that extends from ground to the upper winding of relay 110, contact 131, the +L conductor to the preceding circuit (101 or 102) returning over the —L conductor through contact 132, and the lower winding of relay 110 to battery. Relay 110 operates closing ground at its contacts 112 to contact 155 and the break after make contact 122 to the coil of relay 120 causing it to operate. Relay 120 then locks at its make before break contact 122 to the same ground. The operation of relays 110 and 120 completes a holding loop to the ticketer then being accessed, at contacts 111 and 121. This loop then extends from the ticketer in group 103 then being accessed over the +L conductor associated with the ticketer through the bank contact and wiper of level 171 through the 500 ohm noninductive resistance R1 to contact 121 and 111 and via the wiper and bank contact of level 173 via the —L conductor to the ticketer.

At the time the first dial impulse is received from the preceding circuit, relay 110 restores opening the holding loop previously outlined at contact 111 releasing the ticketer. Relay 120 because of its slow to release characteristics does not restore at this time. The restoration of relay 110 restores ground at contact 114 which is further extended through contacts 128 and 137 to the coil of relay 150 causing it to operate.

When the first dial pulse is completed relay 110 reoperates returning ground at contacts 112 to continue to hold relay 120 operated, and restores the holding loop to the ticketer at contacts 111. The same ground that was restored at contacts 112 is further extended into contacts 155 and 123 to the upper winding of relay 140 causing it to operate.

If another dial pulse is received indicating the dialing of a digit greater than 1 in the preceding circuitry this is an indication that a ticketer must be seized for completion of the call. This is accomplished in the following manner: Upon receipt of the second dial pulse the relay 110 again restores placing ground at contacts 114 to be extended through contacts 128 and 146 to the upper winding of relay 130 causing it to operate. Removal of ground at contacts 112 is not effective to restore relay 120, however it removes ground from the upper winding of relay 140 and has been holding relay 140 operated over a path that extended from battery through the upper coil of relay 140, through contacts 123 and 155, to ground at contact 112. With the restoration of relay 140 and the operation of relay 130 the +L and —L leads are now connected directly to the ticketer at contacts 131, 141 and 132, 142 respectively.

When the second dial pulse is completed the circuit path to relay 110 no longer exists so it does not reoperate. Relays 120 and 150 both of which are the slow to release type restore at this time inasmuch as operating grounds for these relays are no longer available. Relay 130 is held operated over ground returned from the ticketer lead C1 via the bank contact and wiper of level 176 through contacts 125, 135 and 134 through the upper winding of relay 130 and then to battery. At the completion of the call, the loop circuit is broken, ground is no longer returned from the ticketer and relay 130 restores.

If a second dial impulse did not follow the first, indicating that the digit 1 was dialed, this is the indication that a special second selector is to be accessed for completion of the call. If this is the case relay 150 restores and holding ground is no longer available at contacts 114 and the adapter 100 prepares to access the selector at contacts 151, 153 and 157 respectively. If ground is returned over the HU2 lead from the selector then being accessed by level 177 of the rotary switch indicating a busy selector ground is extended through contacts 157, 148, 136 and the interrupter 179B to the motor magnet 170 causing it to operate. Operation of motor magnet 170 causes the rotary switch to hunt in a self interrupted manner until such time as a bank contact on level 177 is encountered over which ground is no longer returned indicating an available selector. When an available selector is discovered hunting ceases and battery is returned via the associated C2 lead and level 175 of the rotary switch to contact 147, contact 124 lower winding of relay 130, contact 145 and contact 156 to ground thus causing the operation of relay 130. Relay 130 upon operation cuts the accessing circuit through to the special selector 104 at contacts 131 and 132 respectively. Operation of relay 130 by disconnecting the incoming +L and —L leads from relay 110 causes that relay to restore and subsequently by removal of ground at contacts 112, relay 120 restores. Additional dial pulses are now transmitted directly from the accessing circuit 101 or 102 to the special second selector 104 for completion of the call. Upon completion of this call battery is no longer returned via the C2 lead and level 175 of the rotary switch. Relays 230 and 240 restore. The adapter circuit is now ready to process another call.

What is claimed is:

1. In an automatic toll ticketing telephone system, an access circuit, a ticketer, a special selector, and an adapter circuit comprising: control means connected to said access circuit; connecting means including circuit connections to said access circuit, to said ticketer, and to said special selector, and further including a circuit connection to said control means; said control means operated in response to receipt of a first pulse transmitted to said access circuit to condition said connecting means to prepare a connection between said access circuit and said ticketer, and in response to receipt of a second pulse from said access circuit, transmitted within a predetermined time interval, to operate said connecting means to connect said access circuit to said ticketer; and timing means included in said control means, operated in response to absence of receipt of said second pulse, after the expiration of said predetermined time interval to operate said connecting means to connect said access circuit to said special selector.

2. In an automatic toll ticketing telephone system as claimed in claim 1 wherein said timing means comprise a slow to release relay.

3. In an automatic toll ticketing telephone system, an access circuit, a plurality of ticketers, a plurality of special selectors, and an adapter circuit comprising: control means connected to said access circuit, connecting means including a circuit connection to said access circuit and a circuit connection to said control means; switching means including individual circuit connections to each of said plurality of ticketers, and to each of said plurality of special selectors, and circuit connections to said connecting means, and to said control means, self operated to connect said connecting means to an available one of said plurality of ticketers; said control means operated in response to receipt of a first pulse transmitted to said access circuit to condition said connecting means to prepare a connection between said access circuit and said available ticketer through said switching means, and in response to receipt of a second pulse transmitted within a predetermined time interval from said access circuit to operate said connecting circuit to connect said access circuit to said ticketer through said switching means; and timing means included in said control means operated in response to absence of receipt of said second pulse, after the expiration of said predetermined time interval to further operate said switching means to connect said connecting means to an available one of said special selectors, and to operate said connecting means to connect said access circuit to said available special selector through said switching means.

4. In an automatic toll ticketing telephone system as claimed in claim 1 wherein said switching means comprise a rotary switch including: a plurality of banks having individual circuit connections to each of said ticketers, and a plurality of individual circuit connections to each of said special selectors, and having wipers connected to said connecting means, and operating means connected to said control means.

5. In an automatic toll ticketing telephone system, a plurality of access circuits, a plurality of ticketers, a plurality of special selectors, and an adapter circuit comprising: control means connectable to said access circuit, connecting means connectable to said access circuit and including a circuit connection to said control means; seizure means connected to said access circuits operated in response to seizure by any one of said plurality of access circuits to connect said circuit to said control means and to said connecting means; switching means including individual circuit connections to each of said plurality of ticketers and to each of said plurality of special selectors, and circuit connections to said connecting means, and to said control means, self operated to connect said connecting means to an available one of said plurality of ticketers; said control means operated in response to receipt of a first pulse transmitted from said access circuit to condition said connecting means to prepare a connection between said access circuit and said available ticketer through said switching means, and in response to receipt of a second pulse transmitted within a predetermined time interval from said access circuit, to operate said connecting circuit to connect said access circuit to said ticketer through said switching means; and timing means included in said control means operated in response to absence of receipt of said second pulse, after the expiration of said predetermined time interval to further operate said switching means to connect said connecting means to an available one of said special selectors and to operate said connecting means to connect said access circuit through said available selector to said switching means.

6. In an automatic toll ticketing telephone system as claimed in claim 5 wherein said timing means comprise a slow to release relay.

7. In an automatic toll ticketing telephone system as claimed in claim 5 wherein said switching means comprise a rotary switch including a plurality of banks having individual circuit connections to each of said ticketers, and a plurality of individual circuit connections to each of said special selectors and having wipers connected to said connecting means, and operating means connected to said control means.

8. In an automatic toll ticketing telephone system as claimed in claim 5 wherein said seizure means comprise a relay including circuit connections to all of said plurality of access circuits.

No references cited.

KATHLEEN H. CLAFFY, *Primary Examiner.*

H. ZELLER, *Assistant Examiner.*